United States Patent Office 3,520,898
Patented July 21, 1970

3,520,898
2-TRICHLORO-METHYLBENZOXAZOLES
George Holan, Brighton, Victoria, and Eva Lea Samuel, Bentleigh, Victoria, Australia, assignors to Monsanto Chemicals (Australia) Limited, West Foostscray, Victoria, Australia, a company of Australia
No Drawing. Continuation-in-part of application Ser. No. 514,380, Dec. 16, 1965. This application Aug. 24, 1967, Ser. No. 662,889
Int. Cl. C07d 85/48
U.S. Cl. 260—307    12 Claims

ABSTRACT OF THE DISCLOSURE

Compound of the formula

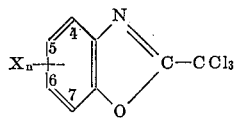

where $n$ is an integer from 1 to 2 and X is selected from the group consisting of halogen, nitro, hydroxy, alkyl, alkoxy, phenyl, phenoxy, carboxy, carbalkoxy, haloalkyl, alkoxyalkyl, halophenyl, nitrophenyl, alkylphenyl and alkoxyphenyl wherein each alkyl and alkoxy is of not more than 4 carbon atoms. The compounds exhibit fungicidal and anthelmintic activity.

---

This application is a continuation-in-part of application Ser. No. No. 514,380, filed Dec. 16, 1965 (now abandoned).

This invention relates to substituted 2-trichloromethylbenzoxazoles of the formula

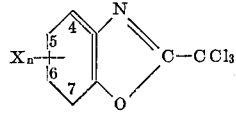

where $n$ is an integer from 1 to 2 and X is selected from the group consisting of halogen, nitro, hydroxy, alkyl, alkoxy, phenyl, phenoxy, carboxy, carbalkoxy, haloalkyl, alkoxyalkyl, halophenyl, nitrophenyl, alkylphenyl and alkoxyphenyl wherein each alkyl and alkoxy is of not more than 4 carbon atoms.

In the above formula, the halogen can be Cl, Br, F or I but is preferably Br or Cl. The alkyl and alkoxy can be methyl, ethyl, propyl, isopropyl, n-butyl, isobutyl, sec-butyl, t-butyl, methoxy, ethoxy, n-propoxy isopropoxy, n-butoxy, isobutoxy, sec-butoxy and t-butoxy.

In the above formula, X is preferably selected from the group consisting of halogen, alkyl and nitro.

The compounds of the present invention can be prepared by a number of methods, for example, (1) reaction of the appropriately substituted o-aminophenol with chloral, the intermediate Schiff's base then being oxidized to the nuclear-substituted 2 - trichloromethylbenzoxazole by treatment with lead tetra-acetate; (2) electrophilic substitution of the parent 2-trichloromethylbenzoxazole to yield certain of the nuclear-substituted compounds, for example, chlorination of the parent 2-trichloromethylbenzoxazole in the presence of aluminum chloride as catalyst to yield monochloro-2-trichloromethylbenzoxazole, or nitration with fuming nitric acid or other nitrating agent; (3) reaction of the appropriately substituted o-aminophenol with trichloroacetonitrile, in a suitable solvent; and (4) reaction of the appropriately substituted o-aminophenol with an alkyl trichloromethylacetamidate.

Preparation of the compounds of this invention by reacting an appropriately substituted o-aminophenol with an alkyl trichloromethylacetimidate can be carried out simply by mixing the two reactants together, preferably in the presence of a solvent or diluent, and leaving them in contact until reaction is essentially complete. Suitable solvents are alcohols, conveniently methanol; esters such as ethyl acetate; ketones, for example, acetone; and ethers, for example, 1,2-dimethoxyethane or alkyl trichloroacetimidate. Anhydrous reaction conditions are desirable as any water present hydrolyzes the imidate component. The reaction is only mildly exothermic and the reactants can be mixed in any order. Normally stoichiometric amounts of the two reactants are used, but either one can be used in excess if desired.

Reaction temperature and time of reaction will vary depending upon the nature of the substituents in the aminophenol. Electron-withdrawing substituents such as the nitro-group retard the reaction and higher temperatures are usually required for completion of the reaction within a few hours. Electron-donating groups such as alkyl and alkoxy groups facilitate the reaction, which may then be conducted at room temperature. In general, the reaction temperature is kept as low as possible, as is consistent with obtaining a reasonable reaction rate, in order to minimize the formation of by-products. The resultant 2-trichloromethylbenzoxazole products can be worked up and purified by conventional means. All are solid at normal temperatures, and often crystallize cleanly from the reaction mixture, or can be precipitated by any suitable means. Products of low molecular weight are conveniently purified by sublimation or distillation, followed by crystallization.

Illustrative of the compounds of this invention embraced by the above formula are 2-trichloromethyl-5-methylbenzoxazole;
2-trichloromethyl-5,6-dimethylbenzoxazole;
2-trichloromethyl-5-methoxybenzoxazole;
2-trichloromethyl-5-chlorobenzoxazole;
2-trichloromethyl-5-bromobenzoxazole;
2-trichloromethyl-5,6-dichlorobenzoxazole;
2-trichloromethyl-5-chloromethylbenzoxazole; and
2-trichloromethyl-5-nitrobenzoxazole.

Some of these and other such compounds in accordance with this invention can be derived from o-aminophenols such as 4-chloro-2-aminophenol;
5-bromo-2-aminophenol;
4,6-dichloro-2-aminophenol;
4-chloro-6-phenyl-2-aminophenol;
2-amino-3-hydroxybenzoic acid;
3-amino-4-hydroxytoluene;
2-amino-4-nitro-6-chlorophenol;
2-amino-4-nitrophenol; and
3,4,5,6-tetrachloro-2-aminophenol.

Preparation of the new compounds of the invention is illustrated by the following examples:

EXAMPLE 1

2-trichloromethyl - 5,7 - dichlorobenzoxazole was prepared as follows:

2-amino-4,6-dichlorophenol (1.0 g.) and methyl trichloroacetimidate were mixed in absolute ethanol (10 ml.) and the solution was refluxed 2 hours. On concentrating the solution crystals of 2-trichloromethyl-5,7-dichlorobenzoxazole (0.3 g.) were obtained which after recrystallization from methanol had M.P. 84° C. Found (percent): C, 31.7; H, 0.9; N, 4.2; Cl, 58.3; $C_8N_2NOCl_5$ (percent) requires C, 31.3; H, 0.7; N, 4.6; Cl, 58.5.

EXAMPLE 2

2-trichloromethyl-5-chloro-7-phenylbenoxazole was prepared as follows:

A solution of 2-amino-4-chloro-6-phenyl phenol (0.75 g.) and methyl trichloroacetimidate (0.6 g.) was left at room temperature for three days. The crystals which formed (0.35 g.) were recrystallized from methanol to give 2-trichloromethyl-5-chloro-7-phenylbenzoxazole M.P. 111° C. Found (percent): C, 48.6; H, 2.2; N, 4.0; Cl, 41.0; $C_{14}H_7NOCl_4$ (percent) requires C, 48.4; H, 2.0; N, 3.8; Cl, 40.9.

EXAMPLE 3

2-trichloromethyl-5-nitrobenzoxazole was prepared as follows:

A solution of 2-amino-4-nitrophenol (4.6 g.) and methyl trichloroacetimidate (5.4 g.) in absolute ethanol was refluxed for four hours. Impurities were filtered off and concentration of the filtrate and cooling gave 2-trichloromethyl-5-nitrobenzoxazole (3 g.), M.P. 79° C.

EXAMPLE 4

2-trichloromethyl-5-chlorobenzoxazole was prepared as follows:

A solution of 2-amino-4-chlorophenol (4.3 g.) and methyl trichloroacetimidate (5.4 g.) in absolute ethanol was allowed to stand at room temperature for three days. Impurities were filtered off with the aid of carbon and concentration of the solution gave 2-trichloromethyl-5-chlorobenzoxazole (3.5 g.) M.P. 84° C.

EXAMPLE 5

Monochloro-2-trichloromethylbenzoxazole was prepared as follows:

Chlorine was passed into molten 2-trichloromethylbenzoxazole containing anhydrous aluminum chloride (0.2 g.) at 100° C. until the mixture had gained 1.57 g. weight. The crude reaction product was chromatographed in petroleum ether on an alumina column and the white solid obtained in the fore-runnings from the column (6.0 g.) was recrystallized from methanol to give monochloro-2-trochloromethylbenzoxazole as colorless prisms, M.P. 72–73° C. Found (percent): C, 35.6; H, 1.4; Cl, 52.6; $C_8H_3NOCl_4$ (percent) requires C, 35.5; H, 1.1; Cl, 52.4.

EXAMPLE 6

2-trichloromethyl-5,7-dibromobenzoxazole was prepared as follows:

A mixture of 2-amino-4,6-dibromophenol (1.3 g.) and methyl trochloroacetimidate (0.9 g.) were refluxed in methanol for 1½ hours. Evaporation of the resultant solution gave the crude product which, after recrystallization from methanol, had M.P. 120° C. Yield 60%. Found (percent): C, 24.7; H, 0.5; N, 3.2; Cl, 26.5; and Br, 40.2. $C_8H_2NOCl_3Br_2$ (percent) requires C, 24.4; H, 0.5; N, 3.5; Cl, 27.0 and Br, 40.5.

The substituted-2-trichloromethylbenzoxazoles of this invention are useful as pesticides, particularly fungicides and nematocides. In practicing the fungicidal methods of this invention, one or more of the present 2-trichloromethylbenzoxazoles is applied to the fungal organisms or the material to be treated for the control of fungi in an amount sufficient to exert fungicidal activity. The fungicidal compounds of this invention are particularly effective when applied directly to the soil for control of soil-borne fungal organisms. They are also effective in the treatment of plant life such as vegetables, ornamental plants and fruit-bearing trees; organic fibers and fabrics; leather; paints and lubricating oils, and various cellulosic materials such as wood. In application to soil and plants, fungicidal control is obtained in most instances by the application of from about 0.01 pound to about 25 pounds of active ingredient per acre. The preferred amount is determined by and dependent upon the particular fungicidal compound selected, the method of application, and in the case of application to plant life, the state an condition of growth and the climatic conditions.

The effectiveness of the substituted-2-trichloromethylbenzoxazole active ingredients of this invention as fungicides is illustrated below.

An intimate mixture of 2 volumes of yellow corn meal and 3 volumes of white sand is infested with *Rhizoctonia solani* and incubated for two weeks at 20° C. Then one volume of this infested mixture is blended uniformly with 3 volumes of a good grade of top soil which had been sterilized. To accomplish complete blending the composite of soil and infested mixture is passed through a No. 8 screen three times. A number of small cups are then tightly packed with 30 gram portions of the composite and the surface thereof leveled.

A sufficient amount of active ingredient is dissolved in acetone to make a 1% by weight solution which is then diluted with water to provide a formulation having a concentration of 0.1% by weight. To provide the desired concentration in the aforedescribed soil composite the following further dilutions with water are made:

Conc. desired in soil in p.p.m. _____ 30
Ml. of 0.1% formulation _____ 1
Ml. of water added to formulation _____ 3

The 4 ml. portions are drenched over the surface of the soil in each cup, care being taken to insure even distribution. The cups are then placed in a 100% humidity chamber at 70° F. for 44 hours. Upon removal from the chamber the amount of mycelial growth on the surface of the soil is noted and rated as follows:

1=no growth
2=growth from corn meal only
3=some growth in soil away from corn meal particles
4=surface covered but little aerial growth
5=growth equivalent to that on untreated soil.

The results obtained with representative active ingredients and with 2-trichloromethylbenzoxazole at a soil concentration of 30 p.p.m. are set forth below in Table I.

Table I

| Compound: | Rating |
|---|---|
| 2-trichloromethylbenzoxazole | 5 |
| 5-chloro-2-trichloromethylbenzoxazole | 1 |
| 7-chloro-2-trichloromethylbenzoxazole | 2 |
| 5,7-dichloro-2-trichloromethylbenzoxazole | 1 |
| 5-nitro-2-trichloromethylbenzoxazole | 1 |
| 5,6-dichloro-2-trichloromethylbenzoxazole | 1 |
| 2-bromo-2-trichloromethylbenzoxazole | 1 |

In the treatment of Nemathelminthes in soil and on plants in accordance with this invention, the anthelmintic substituted-2-trichloromethylbenzoxazoles are preferably applied to the area to be treated as granules with a conventional fertilizer spreader, as emulsifiable concentrate or wettable powder with a sprayer, or as a dust with a conventional duster, or they can be absorbed in activated carbon for application to seeds.

Veterinary application of anthelmintic substituted-2-trichloromethylbenzoxazoles in accordance with this invention for the treatment of Nemathelminthes and Platyhelminthes in animals can be carried out with anthelmintic compositions in the form of a liquid drench, suitably formulated tablets or capsules, or animal feed compositions. The anthelmintic substituted-2-trichloromethylbenzoxazoles can be incorporated into any of the general types of feed rations conventionally fed to animals, e.g. dry laboratory chow diets; moist, semi-solid diets; relatively dry grain forage mixtures, and the like as well as in the drinking water taken in by the animal to be treated. In the treatment of animal parasitic worms the anthelmintic compounds are preferably administered orally as a liquid drench or tablet or capsule in unit dosage form. Alternatively, the anthelmintic compounds can be incorporated into urea or salt licks or blocks.

The anthelmintic compounds are usually applied to soil in the treatment of Nemathelminthes at a rate from about 0.001 to about 100 pounds per acre. Veterinary compositions for use in controlling parasitic infestations in animals vary widely with respect to amount of anthelmintic compound depending upon factors such as type of composition, the host animal to be treated, the dose level desired and the severity and type of parasitic infestation. Generally the anthelmintic compound is employed in an amount from about 5 mg./kg. to about 500 or more mg./kg. of body weight of the treated animal.

The anthelmintic compounds of this invention also can be applied to the parasitic infestations in admixture with other anthelmintics, medicaments, vitamin additive mixtures, and the like.

The anthelmintic activity of the substituted-2-trichloromethylbenzoxazoles of this invention is illustrated below:

Aqueous suspensions of the nematode *Turbatrix aceti* are admixed separately with 5-chloro-2-trichloromethylbenzoxazole, 5-methyl-2-trichloromethylbenzoxazole, 5,6-dichloro-2-trichloromethylbenzoxazole and 5-bromo-2-trichloromethylbenzoxazole to provide admixtures containing 10 p.p.m. of the benzoxazole. A complete kill of the nematode is effected by each treatment.

The above procedure is repeated using 2-trichloromethylbenzoxazole without any adverse effect on the nematode.

The pesticidal compositions (i.e., fungicidal and nematocidal) of this invention contain at least one active ingredient and a material referred to in the art as a fungicidal or nematocidal adjuvant in liquid or solid form. The pesticidal compositions are prepared by admixing the active ingredient with an adjuvant including diluents, extenders, carriers and conditioning agents to provide compositions in the form of finely-divided particulate solids, granules, pellets, aerosols, solutions and aqueous dispersions or emulsions. Thus, the active ingredient can be used with an adjuvant such as a finely-divided particulate solid, a liquid of organic origin, water, a wetting agent, dispersing agent, an emulsifying agent or any suitable combination of these.

Typical finely-divided solid carriers and extenders which can be used in the pesticidal compositions of this invention include for example, the talcs, clays, pumice, silica, diatomaceous earth, quartz, fuller's earth, salt, sulfur, powdered cork, powdered wood, walnut flour, chalk, charcoal, tobacco dust, volcanic ash, and the like. Typical liquid diluents include for example, water, kerosene, Stoddard solvent, hexane, benzene, toluene, acetone, ethylene dichloride, xylene, alcohols, diesel oil, glycols and the like. Typical diluents for aerosols include, for example, trichlorofluoromethane, dichlorofluoromethane, and the like.

The pesticidal compositions of this invention, particularly liquids and wettable particles, usually contain as a conditioning agent one or more surface-active agents in amounts sufficient to render a given composition readily dispersible in water or in oil. By the term "surface-active agent" it is understood that wetting-agents, dispersing agents, suspending agents, emulsifying agents and the like are included therein.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, and other surface-active agents.

The pesticidal compositions of this invention generally contain from about 0.005% to about 95% by weight of the active fungicidal or anthelmintic ingredient.

The active compounds of the present invention can be employed in combination with other fungicides to give compositions that have broad spectrum fungicidal activity. In these mixtures, the auxiliary fungicidally active materials can be present in any desired amount, ordinarily from about 0.1 to about 20 parts by weight per one part by weight of a compound of this invention. In some instances it may even be desirable to employ two or more auxiliary fungicides.

Typical of the auxiliary fungicides that can be employed in combination with the compounds of the present invention are the following:

N-trichloromethylthio-4-cyclohexene-1,2-dicarboximide
Tetramethylthiuram disulfide
Manganese ethylene-bis-dithiocarbamate
Ferric dimethyl dithiocarbamate
Zinc ethylene-bis-dithiocarbamate
Zinc dimethyl dithiocarbamate
Tetra copper calcium oxychloride
Tetrachloro-p-benzoquinone
2,3-dichloro-1,4-naphthoquinone
2-dichloro-6-(o-chloroanilino)triazine
Ethylene thiuram monosulfide
2-heptadecyl glyoxalidine acetate
Ferric dimethyl dithiocarbamate plus 2-mercaptobenzothiazole
Manganese dimethyl dithiocarbamate plus 2-mercaptobenzothiazole
Copper dihydrazinium sulfate
Copper-S-quinolinolate
Cycloheximide
Terramycin
Streptomycin When operating in accordance with the present invention the substituted-2-trichloromethylbenzoxazoles or compositions containing them can be applied to the organisms to be controlled, or to their habitats in any convenient fashion, e.g. by means of hand dusters or sprayers. Applications to the above-ground portions of plants conveniently can be carried out with powder dusters, boom sprayers and spray dusters. In foliar applications, the employed compositions should not contain any appreciable amount of phytotoxic diluents. In large scale operations, dusts or low volume sprays may be applied from airplanes.

The term "pesticidal composition" as used herein and in the appended claims is intended to mean not only compositions in a suitable form for application but also concentrated compositions which require dilution or extension with a suitable quantity of liquid or solid adjuvant prior to application.

Although the invention is described with respect to specific modifications, the details thereof are not to be construed as limitations except to the extent indicated in the following claims.

What is claimed is:

1. Compound of the formula

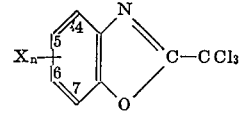

wherein *n* is an integer from 1 to 2 and X is halogen.

2. Compound of the formula

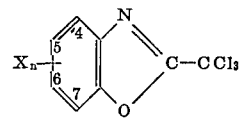

wherein *n* is an integer from 1 to 2 and X is alkyl of not more than 4 carbon atoms.

3. Compound of the formula

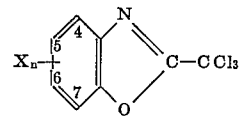

wherein *n* is an integer from 1 to 2 and X is alkoxy of not more than 4 carbon atoms.

4. Compound of the formula

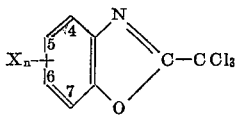

wherein n is an integer from 1 to 2 and X is haloalkyl of not more than 4 carbon atoms.

5. Compound of claim 2 which is 2-trichloromethyl-5-methylbenzoxazole.

6. Compound of claim 2 which is 2-trichloromethyl-5,6-dimethylbenzoxazole.

7. Compound of claim 3 which is 2-trichloromethyl-5-methoxybenzoxazole.

8. Compound of claim 1 where is 2-trichloromethyl-5-chlorobenzoxazole.

9. Compound of claim 1 which is 2-trichloromethyl-5-bromobenzoxazole.

10. Compound of claim 1 which is 2-trichloromethyl-5,6-dichlorobenzoxazole.

11. Compound of claim 1 which is 2-trichloromethyl-5,7-dichlorobenzoxazole.

12. Compound of claim 4 which is 2-trichloromethyl-5-chloromethylbenzoxazole.

References Cited

UNITED STATES PATENTS

| | | | |
|---|---|---|---|
| 2,583,425 | 1/1952 | Hawley | 167—30 |
| 2,932,649 | 4/1960 | Metivier | 260—304 |
| 2,985,661 | 5/1961 | Hein et al. | 260—304 |
| 3,153,653 | 10/1964 | Raasch | 260—307 |
| 3,284,294 | 11/1966 | Sasse | 260—307 |
| 3,346,584 | 10/1967 | Manning | 260—304 |

OTHER REFERENCES

Burger: Medicinal Chemistry, 1960, p. 1055.

Mizund et al.: Pharm. Soc. Japan Journal, vol. 72 (1952), pp. 1263–5.

Stephens et al.: J. Chem. Soc. London, 1950, pp. 1722–6.

ALEX MAZEL, Primary Examiner

R. J. GALLAGHER, Assistant Examiner

U.S. Cl. X.R.

424—272, 245, 249